Patented Apr. 16, 1946

2,398,709

UNITED STATES PATENT OFFICE 2,398,709

HYDROXYCHOLANIC ACIDS

Willard M. Hoehn, Kansas City, Mo., and Alexander W. Schneider, Kalamazoo, Mich., assignors to George A. Breon & Company, Kansas City, Mo., a corporation of Missouri No Drawing. Original application October 7, 1940, Serial No. 360,137. Divided and this application August 4, 1944, Serial No. 548,143

4 Claims. (Cl. 260—397.1)

This invention relates to compounds of the cyclopentanopolyhydrophenanthrene series, particularly to the cyclopentanopolyhydrophenanthrol carboxylic acids, and to a method for preparing the same.

This application is a division of our copending application, Serial No. 360,137, filed October 7, 1940.

Among the objects of the invention is the provision of new intermediate compounds of the class described, useful for the preparation of other compounds of this class. Other objects will be in part apparent and in part pointed out hereinafter.

The invention accordingly comprises the ingredients and combinations of ingredients, the proportions thereof, steps and sequence of steps, and features of composition and synthesis, analysis, or metathesis, which will be exemplified in the products hereinafter described, and the scope of the application of which will be indicated in the following claims.

Accordingly the present invention relates to polyhydroxycholanic acids, that is, compounds of the $C_{24-20}$ series, and more particularly to the conversion of these compounds into the corresponding mono and dihydroxy cholanic acids, for example. The present invention is applicable, not only to the polyhydroxycholanic acids, such as cholic acids, but likewise to norcholanic, bisnorcholanic and etiocholanic acids. The starting materials of the present invention may be illustrated by the following formula:

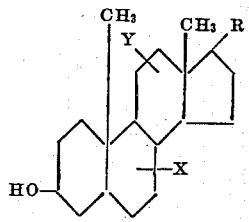

where X and Y are hydrogen or hydroxyl groups, and where R is a carboxyl group or an aliphatic side chain terminating in a carboxyl group. The carboxyl group may or may not be esterified.

The polyhydroxycholanic acids and esters of these acids are oxidized in such a manner that the secondary hydroxyl group on the third carbon atom is not converted to a keto group. To obtain the maximum yield, the 3-hydroxyl group of the polyhydroxycholanic acid is converted to the 3-acyl ester, thus leaving only the remaining hydroxyl group or groups capable of oxidation. Where there are two or more such secondary hydroxyl groups present, limitation of the oxidizing agent used produces hydroxyketo rather than polyketo compounds. The oxidized products are not isolated, but are converted to semicarbazones, or hydrazones. Polysemicarbazones may be separated from monosemicarbazones by the difference in their solubility. The semicarbazones are then decomposed with alkalis at 170 to 200° C. to yield the monohydroxy or dihydroxycholanic acids. Thus, for example, lithocholic acids can be obtained in high yield from methyl cholate or from methyl desoxycholate.

Typical of the oxidizing agents which may be used for converting the secondary hydroxyl group or groups to a keto group or groups, are chromic acid in acetic acid or in aqueous acetic acid solutions, aqueous acetic acid solutions of chromic acid in conjunction with an inert solvent, such as benzene, toluene, ether, chloroform, etc., potassium dichromate and dilute sulfuric acid in conjunction with an inert solvent, and potassium permanganate with an inert solvent.

The semicarbazones are prepared by the use of semicarbazide hydrochloride in the presence of pyridine or sodium or potassium acetate. Hydrazine hydrate is used to prepare the hydrazones if they are formed. Alkalis which may be used for the decomposition of the semicarbazone or hydrazone are, aqueous sodium or potassium hydroxide solutions; alcoholic sodium or potassium hydroxide solutions is a suitable alcohol such as methyl, ethyl, propyl, etc., alcohols; sodium alkoxide in a suitable alcohol, such as methyl, ethyl, propyl, isopropyl, butyl, etc. alcohols; and sodium benzyloxide.

Typical of the aroyl chlorides which may be used to convert the hydroxyl group on the 3-carbon atom to an acyl ester, are benzoyl chloride, tosyl chloride, o-benzoyl-benzoyl chloride, etc.

The lithocholic acid obtained from methyl cholate or from methyl desoxycholate melts at 184 to 185° C. and has $$[\alpha]_D^{27°}+33°\pm1.0°$$

The methyl bis-nor-desoxycholate by this method, yields bis-nor-lithocholic acid which melts at 218–220° C.

The following examples are illustrative only of the present invention.

EXAMPLE 1

*Lithocholic acid from cholic acid*

One thousand and fifty-five g. of methyl cholate are dissolved in benzene, and the benzene is partially removed in vacuo. Sufficient dry benzene is added to make up the volume to 4 liters, and to this solution are added 214 ml. of anhydrous pyridine, and 311 ml. of benzoyl chloride. After standing over night the solid cake is triturated with water. The benzene layer is washed well, first with dilute acid, and then with dilute alkali, and finally with water. To this benzene solution is then added with stirring, a solution of 400 g. of chromic oxide in 1500 ml. of water, and 1000 ml. of acetic acid. After the oxidation is completed, the benzene layer is washed well with water, and evaporated in vacuo. The residue is then taken up in 3 liters of methanol, and to this methanol solution is added a solution of 625 g. of semicarbazide hydrochloride in 500 ml. of water, and 1000 ml. of methanol. Upon refluxing the disemicarbazone of methyl 3-benzoxy-7,12-diketocholanate precipitates. This compound has a melting point of 278–280° C. and upon analysis gave N, 13.2%. Calculated for $C_{34}H_{48}O_6N_6$, 13.7%. The suspension is filtered hot, and upon cooling of the mother liquor of the insoluble semicarbazone there is obtained another semicarbazone, the semicarbazone of methyl 3-benzoxy-7-keto-12-hydroxycholanate. This compound has a melting point of 178–180° C. and upon analysis gave N, 7.25%. Calculated for $C_{33}H_{47}O_6N_6$, 7.23%. The semicarbazones are reduced in 170 g. batches, with a solution of 170 g. of sodium in 1800 ml. of methanol at 170° to 210° C. The yield of lithocholic acid from reduction of the disemicarbazone of methyl 3-benzoxy-7,12-diketocholanate is 70 to 80 g. of material which melts at 184 to 185° C.; $[\alpha]_D^{27°}+33°\pm1.0°$ after two recrystallizations from acetone. From the reduction of the semicarbazone of methyl-3-benzoxy-7-keto-12-hydroxycholanate, there is obtained desoxycholic acid with a M. P. of 175.5–176° (corr.), $[\alpha]_D^{27°}+56.8°\pm0.6°$.

EXAMPLE 2

25 g. of the disemicarbazone of methyl 3-benzoxy-7, 12-diketocholanate, prepared as outlined in Example 1, is reduced with a solution of 40 g. of potassium hydroxide in 200 ml. of methanol at 180° C. The lithocholic acid purified by the method previously outlined, has a M. P. of 185° C., $[\alpha]_D^{27°}+33°\pm1.0°$.

EXAMPLE 3

25 g. of the disemicarbazone of methyl 3-benzoxy-7, 12-diketocholanate prepared as outlined in Example 1, is reduced with a solution of 50 g. of sodium hydroxide in 250 ml. of water at 195° C. The lithocholic acid, purified by the method previously outlined, melts at 184 to 185° C., $[\alpha]_D^{27°}+33°\pm1.0°$.

EXAMPLE 4

Bis-nor-lithocholic acid from methyl bis-nor-desoxychlolic acid. To a solution of 11 g. of methyl bis-nor-desoxycholate is added 6 ml. of dry pyridine, and after this solution is cooled to 10° C., 3.5 ml. of benzoyl chloride are added. This mixture is allowed to stand over night, and the benzene solution is then washed thoroughly with water, dilute hydrocholic acid, and then again with water. The benzene is removed and the benzoylated ester is dissolved in 60 ml. of acetic acid. A solution of 5 g. of chromic acid in 40 ml. of 90% acetic acid solution is then added to the benzoylated ester, and after it is allowed to stand for ten minutes, sulfur dioxide is used to reduce the excess chromic acid present. The acetic acid is removed in vacuo, and the residue is extracted with water and ether. The ether solution is washed with dilute hydrochloric acid, dilute potassium hydroxide solution, and finally with water. The ether is then removed, the residue is dissolved in 150 ml. of methanol, and a mixture of 6.3 g. of semicarbazide hydrochloride 6.0 g. of sodium acetate, 5 ml. of pyridine in 20 ml. of methanol, and 15 ml. of water are added. This mixture is refluxed for eight hours, the methanol is then removed in vacuo, and the residue is suspended in hot water and filtered. After it is dried at 40 to 50° C. for ten hours, the semicarbazone of benzoxy-12-keto bis-nor-cholanate is obtained. This compound has a melting point of 178–180° C. and upon analysis gave N, 7.74%. Calculated for $C_{31}H_{43}O_5N_3$, 7.82%. This material is heated four hours at 170 to 200° C. with 120 ml. of 20% sodium methoxide. The bis-nor-lithocholic acid that is obtained after it is isolated by the above described procedure, melts at 218 to 220° C.

From the foregoing, it will be apparent that the present method is convenient for transforming a polyhydroxycyclopentanopolyhydrophenanthrene carboxylic acid or its esters into the corresponding dihydroxy or monohydroxy compound. In addition, the present method is adapted to large scale operation, and is carried out with a minimum isolation of intermediate products. Moreover, where a compound having three or more hydroxyl groups is employed, variation in the amount of the oxidizing agent used produces corresponding variations in the percentages of the hydroxyketo and polyketo compounds that are obtained. The intermediates of the present invention are easily prepared from readily available materials and form desirable materials for the preparation of the dihydroxy and monohydroxy compounds.

In view of the above, it will be seen that the several objects of the invention are achieved and other advantageous results attained.

As many changes could be made in the above without departing from the scope of the invention, it is intended that all matter contained in the above description shall be interpreted as illustrative and not in a limiting sense.

We claim:

1. A compound selected from the group consisting of the disemicarbazone of methyl 3-benzoxy-7, 12-diketocholanate, the semicarbazone of methyl 3-benzoxy-7-keto-12-hydroxycholanate, and the semicarbazone of methyl 3-benzoxy-12-keto bis-nor-cholanate.

2. The disemicarbazone of methyl 3-benzoxy-7,12-diketocholanate.

3. The semicarbazone of methyl 3-benzoxy-7-keto-12-hydroxycholanate.

4. The semicarbazone of methyl 3-benzoxy-12-keto bis-nor-cholanate.

WILLARD M. HOEHN.
ALEXANDER W. SCHNEIDER.